United States Patent
Griffin et al.

(10) Patent No.: US 12,082,019 B2
(45) Date of Patent: Sep. 3, 2024

(54) MESH VERSION CONTROL LIFECYCLE SERVICE

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 286 days.

(21) Appl. No.: 17/703,751

(22) Filed: Mar. 24, 2022

(65) Prior Publication Data

US 2023/0308910 A1    Sep. 28, 2023

(51) Int. Cl.
| | |
|---|---|
| *H04W 24/08* | (2009.01) |
| *G06F 8/71* | (2018.01) |
| *H04W 24/02* | (2009.01) |
| *H04W 24/10* | (2009.01) |
| *H04W 84/18* | (2009.01) |

(52) U.S. Cl.
CPC .............. *H04W 24/08* (2013.01); *G06F 8/71* (2013.01); *H04W 24/02* (2013.01); *H04W 24/10* (2013.01); *H04W 84/18* (2013.01)

(58) Field of Classification Search
CPC ..... H04W 24/08; H04W 24/02; H04W 24/10; H04W 84/18
See application file for complete search history.

(56) References Cited

U.S. PATENT DOCUMENTS

| | | |
|---|---|---|
| 10,791,044 B1 | 9/2020 | Krishan et al. |
| 11,061,717 B2 | 7/2021 | Festa et al. |
| 11,157,253 B1 | 10/2021 | Shteyman et al. |
| 2013/0185563 A1* | 7/2013 | Djabarov ................ H04L 67/34 717/173 |
| 2018/0088935 A1 | 3/2018 | Church et al. |
| 2018/0136931 A1 | 5/2018 | Hendrich et al. |
| 2020/0259928 A1 | 8/2020 | Bonas |
| 2021/0089291 A1* | 3/2021 | Evans ....................... G06F 8/65 |

OTHER PUBLICATIONS

Budinsky, Frank. "Version Routing in a Multicluster Service Mesh", IBM, located on the Internet at: https://istio.io/latest/blog/2019/multicluster-version-routing/ (Feb. 7, 2019), 11 pages.
"Configure Managed Anthos Service Mesh", located on the Internet at: https://cloud.google.com/service-mesh/docs/managed-service-mesh (2021), 13 pages.

* cited by examiner

*Primary Examiner* — Jamal Javaid
(74) *Attorney, Agent, or Firm* — Womble Bond Dickinson (US) LLP

(57) ABSTRACT

A system and method of performing a version control in a mesh network of nodes is disclosed. The method includes executing, by a processing device, a mesh version control life cycle service (VCLS) to maintain a manifest of a mesh network. The manifest comprises, for each node in the mesh network, a history of one or more services executing on a node and a service version for each service of the one or more services. The method includes performing a version control of the mesh network based on the manifest, comprising sending a message to a first node of the mesh network to instruct the first node to change a version of a service executing on the first node from a first version to a second version.

17 Claims, 10 Drawing Sheets

500

Executing a mesh version control life cycle service (VCLS) to maintain a manifest of a mesh network, the manifest comprising, for each node in the mesh network, a history of one or more services on a node, a service version for each service of the one or more services and a firmware version of the node
502

Performing a version control of the mesh network based on the manifest
504

Sending a message to a first node of the mesh network to instruct the first node to perform a rollback of at least one of a service or a firmware from a current version to a previous version
506

FIG. 5

MESH VERSION CONTROL LIFECYCLE SERVICE

TECHNICAL FIELD

The present disclosure relates generally to mesh networks, and more particularly, to systems and methods of performing a version control in a mesh network.

BACKGROUND

A mesh network may include multiple individual nodes/devices, which connect directly, dynamically and non-hierarchically to as many other nodes/devices as possible and cooperate with one another to efficiently route data from/to clients. Each node/device of the mesh network may have its own firmware versions and service versions. The mesh network, from the outside, may be perceived as a singular entity, with the capability of being interfaced through gateway services. The mesh network viewed in this manner has a number of challenges.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a flow diagram depicting a method of performing a version control in a mesh network, according to some embodiments.

DETAILED DESCRIPTION

Figure 1A:
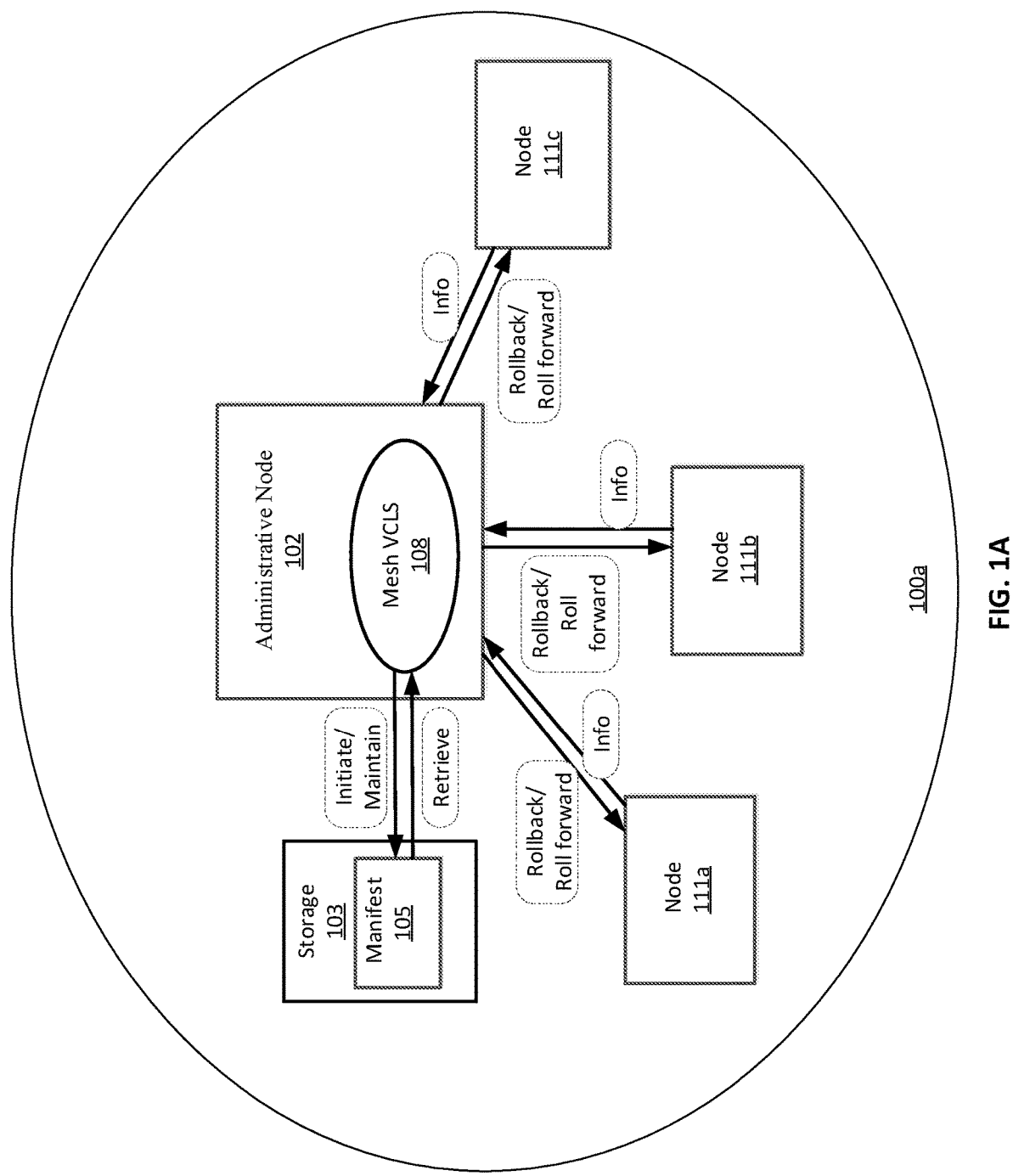
FIG. 1A is a block diagram depicting an example environment for performing a version control in a mesh network, according to some embodiments.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Mesh networking is an approach to organizing device-to-device (node-to-node) communication, for example, within Internet of Things (IoT) platforms. From an IoT perspective, a mesh network may include multiple individual nodes/devices, which connect directly, dynamically and non-hierarchically to as many other nodes/devices as possible and cooperate with one another to efficiently route data from/to clients. Each node/device of the mesh network may store and/or run its own versions of firmware and service versions. The mesh network, from the outside, may be perceived as a singular entity, with the capability of being interfaced through gateway services.

However, the mesh network viewed in this manner has a number of challenges. Vulnerability may be introduced in the mesh network because of updating a service version, and backwards compatibility of the service version may be needed. For example, after an update of a version of a service running on a node in the mesh network, a failure of the service may happen. In order to debug and diagnose what problem has occurred on the node, the node may need to roll back the version of the service from a current version to a previous version. Because the node may interact with other nodes in the mesh network, if only the version of the service on the node is rolled back, the interactions of the node with the other nodes in the mesh network may be missing, which may result in a misdiagnose of the failure of the service. The misdiagnose may result in more messages in the network, a waste of network resources, an increase in network congestion and power consumption.

Aspects of the present disclosure address the above-noted and other deficiencies by performing a version control within a mesh network. A mesh version control lifecycle service (VCLS) may sit within the mesh network and maintain a manifest of the mesh network. The manifest may include service versions on specific nodes with metadata about the nodes as well from a firmware/base operating system (OS) point of view. The mesh VCLS is capable of creating a version control approach for the entire mesh network, by creating a snapshot of the manifest and assigning a numerical identifier to the mesh network. As an example, a repository command, such as GIT command may be used to store the version information for individual nodes. The version information of services for individual nodes may be stored in the manifest, with the ability to extract data to a granular level. For example, the mesh VCLS may perform version control of all firmware of all the nodes, and access the historical firmware versions of all the nodes in the mesh network. With the mesh VCLS, the mesh network may be rolled forward and backwards as a whole, thereby recreating the mesh network at a specific point in time, either by a version or a timestamp. Only a portion of the mesh may be rolled backwards with the mesh VCLS as well. For example, a request may come in indicating that an application programming interface (API) matching to an older version of a service, the nodes running the service in a portion/part of the mesh may be isolated for security compliance, and just the nodes running the service in the portion/part of the mesh may be rolled back to the older version of the service. The capability of rolling all of the services in the portion of the mesh network or the entire mesh may enable diagnosing the problem in the mesh network holistically and accurately, because not only the service on the node under investigation but also the interactions of the node across the mesh network are provided. The environment of mesh network in a previous point of time may be reproduced. Thus, the failure of the service in the mesh network may be solved and the mesh network may be recovered. By this way, a problem in client side expectations may be solved, where backwards compatibility may be needed. The mesh VCLS may allow the mesh network to stay at the latest versions at all times with the capability to dynamically switch to an older version as needed, in an isolated manner, thus providing the most secure experience with compatibility in mind. Accordingly, the embodiments of the present disclosure reduce the amount of networking resources needed to diagnose of the failure of the service, as well as, a decrease in network congestion and power consumption for the overall network infrastructure.

FIG. 1A is a block diagram depicting an example environment for performing a version control in a mesh network 100a, according to some embodiments. The mesh network 100a includes a plurality of nodes 111 (e.g., nodes 111a, 111b, 111c, etc.) and an administrative node 106.

FIG. 1A and the other figures may use like reference numerals to identify like elements. A letter after a reference numeral, such as "111a," indicates that the text refers specifically to the element having that particular reference numeral. A reference numeral in the text without a following letter, such as "111," refers to any or all of the elements in the figures bearing that reference numeral.

The plurality of nodes 111 connect directly, dynamically and non-hierarchically to as many other nodes as possible and cooperate with one another. The administrative node 102 may have the administrative power for the mesh network 100a. The administrative node 102 may oversee and manage the mesh network. The administrative node 102 may have information of the membership of the mesh network 100a. The administrative node 102 may know the type and capability of each node in the mesh network. For example, the administrative node 102 may have information of how to access each node in the mesh network 100a Each node in the mesh network may have a node identifier (ID). Since the membership of the mesh network may constantly change with nodes joining and leaving, the administrative node 102 may manage and update the membership of the mesh network 100a.

Each mesh node 111 and/or the administrative node 102 of the mesh network 100a may be positioned (e.g., arranged, organized) within the mesh network such that the mesh node 111 is within a direct communication range (e.g., radio frequency range) of one or more neighboring mesh nodes when using one or more types of communication capabilities. The mesh node 111 may directly communicate with its neighboring mesh nodes by using one or more types of communication capabilities. A communication capability may include the hardware and/or software resources for communicating via a Bluetooth (BT) connection, a wireless local area network (WLAN) connection, and/or a near field communication (NFC) connection. In some embodiments, the mesh mode 111 includes the hardware and/or software resources for communicating via a cellular network (e.g., LTE, 5G, etc.). In some embodiments, the mesh mode 111 does not include the hardware and/or software resources for communicating via a cellular network (e.g., LTE, 5G, etc.).

The mesh node 111 and the administrative node 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster). The administrative node 102 and/or the plurality of mesh nodes 111 may be implemented by a common entity/organization or may be implemented by different entities/organizations. For example, the administrative node 102 may be operated by a first company/corporation and some of the plurality of nodes may be operated by a second company/corporation.

Still referring to FIG. 1A, the administrative node 102 in the mesh network 100a may execute, by a processing device of the administrative node, a mesh VCLS 108 to maintain a manifest 105 (e.g., a file, metadata) of the mesh network in a storage 103. The manifest 105 may comprise, for each node 111 in the mesh network, a history of one or more services executing on a node and a service version for each service of the one or more services. The administrative node 102 may perform a version control of the mesh network 100a based on the manifest 105. For example, the administrative node 102 may send a message to a first node (e.g., node 111a) of the mesh network to instruct the first node (e.g., node 111a) to change a version of a service executing on the first node from a first version to a second version based on the manifest 105.

In some embodiments, the administrative node 102 may execute the mesh VCLS 108 to initiate the manifest 105 of the mesh network 100a, including querying each node 111 in the mesh network to obtain/extract information of one or more services executing on a node and a service version for each service of the one or more services. In some embodiments, the administrative node 102 may execute the mesh VCLS component 108 to retrieve information regarding the history of the one or more services executing on the node and the service version for each service of the one or more services from the manifest 105. In some embodiments, the administrative node 102 may send a message to each node in a portion of the mesh network or the entire mesh network to instruct each node in the portion of the mesh network or the entire mesh network to perform a rollback of a service from a current version to a previous version. In some embodiments, the administrative node 102 may send a message to each node in a portion of the mesh network or the entire mesh network to instruct each node in the portion of the mesh network or the entire mesh network to perform a roll forward of a service from the previous version to the current version.

Although FIG. 1A shows only a select number of computing devices (e.g., mesh nodes 111, administrative nodes 102), the mesh network 100a may include any number of computing devices that are interconnected in any arrangement to facilitate the exchange of data between the computing devices.

Figure 1B:
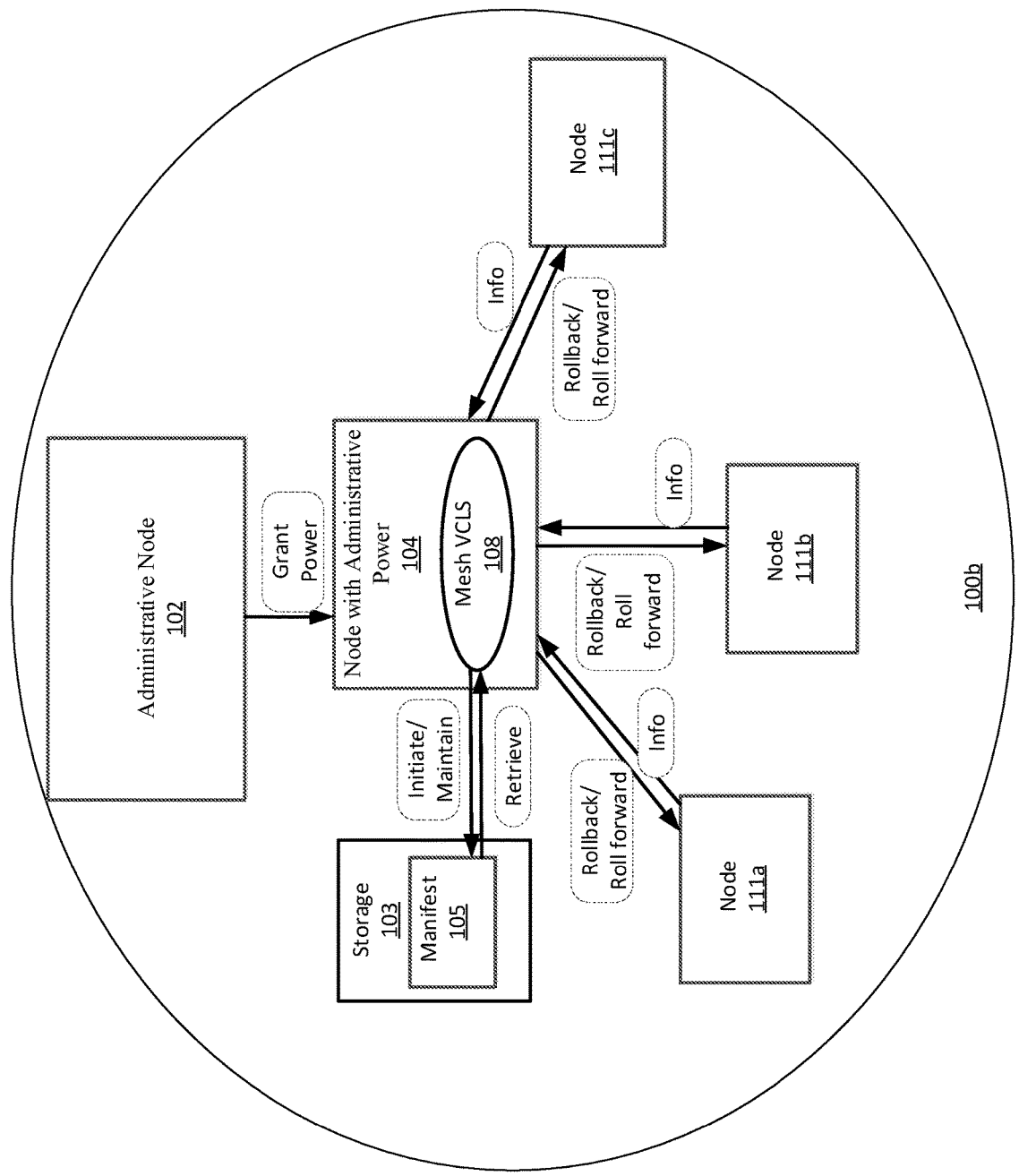
FIG. 1B is a block diagram depicting another example environment for performing a version control in a mesh network, according to some embodiments.

FIG. 1B is a block diagram that illustrates another example mesh network 110b, in accordance with some embodiments. The mesh VCLS 108 may run on any node in the mesh network, as long as the node has administrative power. As illustrated in FIG. 1B, the administrative node 102 may grant administrative power to a node, which may be any node in the mesh network. After being granted the administrative power, the node becomes the node with administrative power 104. For example, the node with administrative power 104 may get information of the membership of the mesh network 110b from the administrative node 102. The node 104 may know all the nodes in the mesh network 110b, and have information of how to access each node in the mesh network 110b. The node with administrative power 104 may perform similar functions with respect to the mesh VCLS 108 as the administrative node 102.

The node with administrative power 104 may execute the mesh VCLS 108 to maintain the manifest 105 of the mesh network in the storage 103. The node with administrative power 104 may perform a version control of the mesh network 100b based on the manifest 105. For example, the node with administrative power 104 may send a message to a first node (e.g., node 111a) of the mesh network to instruct the first node to change a version of a service executing on the first node from a first version to a second version based on the manifest 105.

In some embodiments, the node with administrative power 104 may execute the mesh VCLS 108 to initiate the manifest 105 of the mesh network 100b, including querying each node 111 in the mesh network to obtain/extract information of one or more services executing on a node and a service version for each service of the one or more services. In some embodiments, the node with administrative power 104 may execute the mesh VCLS 108 to retrieve information regarding the history of the one or more services executing on the node and the service version for each service of the one or more services from the manifest 105. In some embodiments, the node with administrative power 104 may send a message to each node in a portion of the mesh network or the entire mesh network to instruct each node in the portion of the mesh network or the entire mesh network to perform a rollback of a service from a current version to a previous version. In some embodiments, the node with administrative power 104 may send a message to each node in a portion of the mesh network or the entire mesh network to instruct each node in the portion of the mesh network or the entire mesh network to perform a roll forward of a service from the previous version to the current version.

Although FIG. 1B shows only a select number of computing devices (e.g., mesh nodes 111, the node with administrative power 104), the mesh network 100b may include any number of computing devices that are interconnected in any arrangement to facilitate the exchange of data between the computing devices.

Figure 2B:
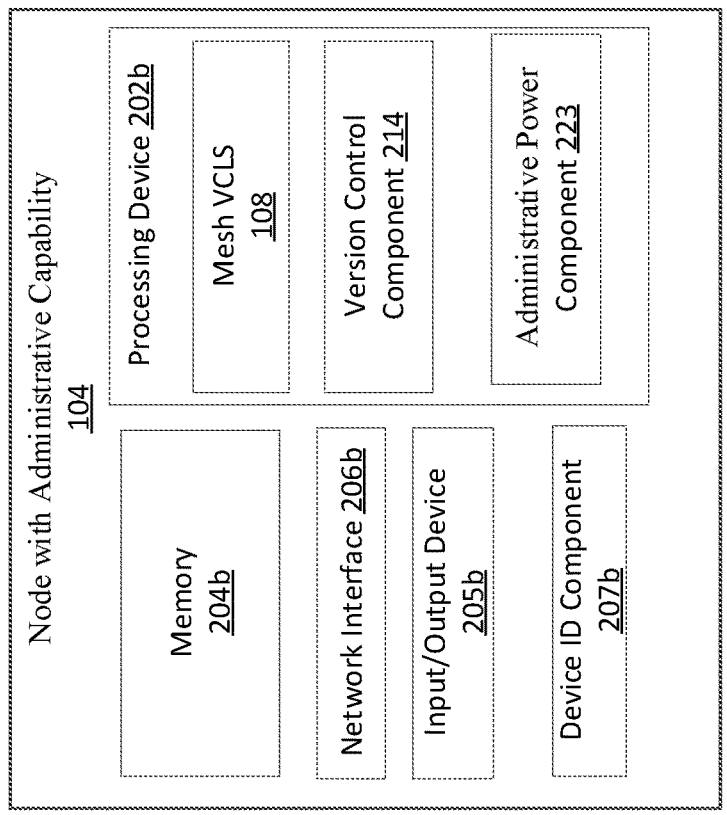
FIG. 2B is a block diagram depicting an example node with administrative power of the mesh network in FIG. 1B, according to some embodiments.
Figure 2A:
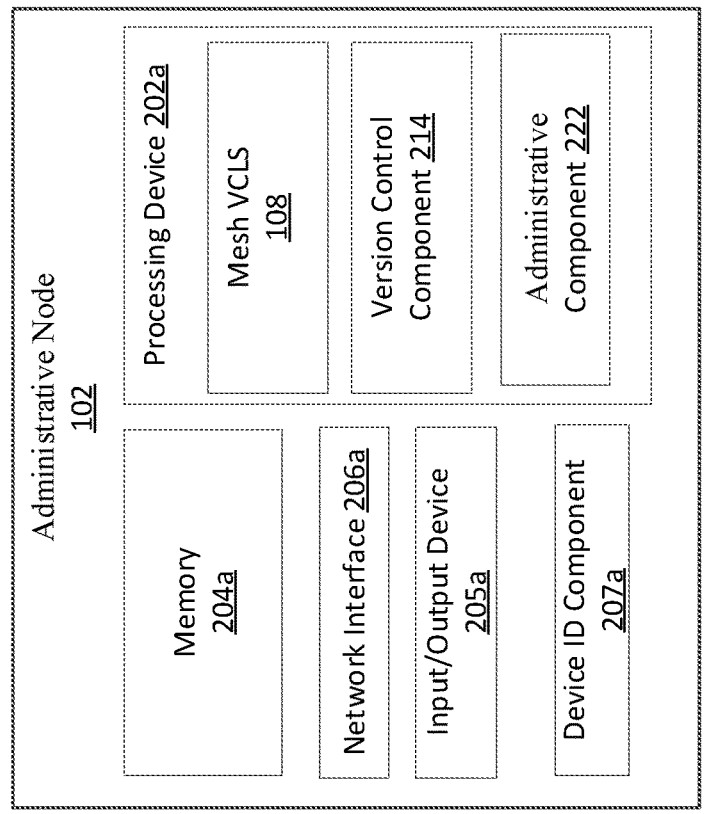
FIG. 2A is a block diagram depicting an example administrative node of the mesh network in FIG. 1A, according to some embodiments.

FIG. 2A is a block diagram depicting an example administrative node 102 of the mesh network 110a in FIG. 1A, according to some embodiments. While various devices, interfaces, components and logic with particular functionality are shown, it should be understood that the administrative node 102 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The administrative node 102 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of administrative node 102. In some embodiments, the processing device 202a and the memory 204a form various processing devices and/or circuits described with respect to the administrative node 102. The instructions include code from any suitable computer programming language such as, but not limited to, C, C++, C#, Java, JavaScript, VBScript, Perl, HTML, XML, Python, TCL, and Basic.

The processing device 202a may execute the mesh VCLS 108 to maintain a manifest 105 of the mesh network in a storage 103. The manifest 105 may comprise, for each node in the mesh network, a history of one or more services executing on a node and a service version for each service of the one or more services. The administrative node 102 may perform a version control of the mesh network 100a based on the manifest 105. For example, the administrative node 102 may send a message to a first node 111a of the mesh network to instruct the first node to change a version of a service executing on the first node from a first version to a second version based on the manifest 105.

As illustrated in FIG. 2A, the processing device 202a may include the mesh VCLS 108, a version control component 214, and an administrative component 222. The mesh VCLS component may be configured to maintain the manifest of the mesh network in the storage. The version control component 214 may be configured to perform the version control of the mesh network 100a based on the manifest.

The processing device 202a may include an administrative component 222 to perform administrative functions of the mesh network. The administrative component 222 may oversee and manage the mesh network. The administrative component 222 may have information of the membership of the mesh network. The administrative component 222 may know the type and capability of each node in the mesh network. For example, the administrative component 222 may access to a node and send instructions to the node in the mesh network.

In some embodiments, the administrative node 102 may execute the mesh VCLS component 108 to retrieve information regarding the history of the one or more services executing on the node and the service version for each service of the one or more services from the manifest 105.

In some embodiments, the administrative node 102 may send a message to each node in a portion of the mesh network or the entire mesh network to instruct each node in the portion of the mesh network or the entire mesh network to perform a rollback of a service from a current version to a previous version.

In some embodiments, the administrative node 102 may send a message to each node in a portion of the mesh network or the entire mesh network to instruct each node in the portion of the mesh network or the entire mesh network to perform a roll forward of a service from the previous version to the current version.

The administrative node 102 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the host machine administrative node 102 includes a plurality of network interfaces 206a of different types, allowing for connections to a variety of networks, such as local area networks (public or private) or wide area networks including the Internet, via different sub-networks.

The administrative node 102 includes an input/output device 205a configured to receive user input from and provide information to a user. In this regard, the input/output device 205a is structured to exchange data, communications, instructions, etc. with an input/output component of the administrative node 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the administrative node 102, such as a built-in display, touch screen, microphone, etc., or external to the housing of the administrative node 102, such as a monitor connected to the administrative node 102, a speaker connected to the administrative node 102, etc., according to various embodiments. In some embodiments, the administrative node 102 includes communication circuitry for facilitating the exchange of data, values, messages, and the like between the input/output device 205a and the components of the administrative node 102. In some embodiments, the input/output device 205a includes machine-readable media for facilitating the exchange of information between the input/output device 205a and the components of the administrative node 102. In still another embodiment, the input/output device 205a includes any combination of hardware components (e.g., a touchscreen), communication circuitry, and machine-readable media.

The administrative node 102 includes a device identification component 207a (shown in FIG. 2A as device ID component 207a) configured to generate and/or manage a device identifier associated with the administrative node 102. The device identifier may include any type and form of identification used to distinguish the administrative node 102 from other computing devices. In some embodiments, to preserve privacy, the device identifier may be cryptographically generated, encrypted, or otherwise obfuscated by any device and/or component of administrative node 102. In some embodiments, the administrative node 102 may include the device identifier in any communication (e.g., distress call, redirect distress call) that the administrative node 102 sends to a computing device.

The administrative node 102 includes a bus (not shown), such as an address/data bus or other communication mechanism for communicating information, which interconnects the devices and/or components of administrative node 102, such as processing device 202a, network interface 206a, input/output device 205a, and/or device ID component 207a.

In some embodiments, some or all of the devices and/or components of administrative node 102 may be implemented with the processing device 202a. For example, the administrative node 102 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example node with administrative power 104 of the mesh network in FIG. 1B, according to some embodiments. The Mesh VCLS 108 may run on any node in the mesh network, as long as the node has administrative power. As illustrated in FIG. 2B, the administrative node 102 may grant administrative power to the node 104 such that the node 104 may have administrative power. For example, the node with administrative power 104 may get information of the membership of the mesh network from the administrative node 102. The node 104 may know all the nodes in the mesh network, and have information of how to access each node in the mesh network.

The node with administrative power 104 includes a processing device 202b, a memory 204b, a network interface 206b, an input/output device 205b and a device ID component 207b, which perform similar functions to the processing device 202a, the memory 204a, the network interface 206a, the input/output device 205a and the device ID component 207a as described with connection to FIG. 2A.

The node with administrative power 104 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the node with administrative power 104 instead of devices and/or components of the administrative node 102.

The memory 204b of processing device 202b stores data and/or computer instructions/code for facilitating at least some of the various processes described herein. The memory 204b includes identical or nearly identical functionality as memory 204a in FIG. 2A, with respect to devices and/or components of the node with administrative power 104 instead of devices and/or components of the administrative node 102.

The processing device 202b may execute the mesh VCLS 108 to maintain a manifest 105 of the mesh network in a storage 103. The manifest 105 may comprise, for each node in the mesh network, a history of one or more services executing on a node and a service version for each service of the one or more services. The node with administrative power 104 may perform a version control of the mesh network 100*a* based on the manifest 105. For example, the node with administrative power 104 may send a message to a first node 111*a* of the mesh network to instruct the first node to change a version of a service executing on the first node from a first version to a second version based on the manifest 105.

As illustrated in FIG. 2B, the processing device 202*b* may include the mesh VCLS 108, the version control component 214, and an administrative power component 223. The mesh VCLS 108 may be configured to maintain the manifest of the mesh network in the storage. The version control component 214 may be configured to perform the version control of the mesh network 100*a* based on the manifest.

The processing device 202*a* may include an administrative power component 223. The administrative power component 223 may have information of the membership of the mesh network. The administrative power component 223 may know the type and capability of each node in the mesh network. For example, the administrative power component 223 may access to a node and send instructions to the node in the mesh network.

In some embodiments, the node with administrative power 104 may execute the mesh VCLS component 108 to retrieve information regarding the history of the one or more services executing on the node and the service version for each service of the one or more services from the manifest 105.

In some embodiments, the node with administrative power 104 may send a message to each node in a portion of the mesh network or the entire mesh network to instruct each node in the portion of the mesh network or the entire mesh network to perform a rollback of a service from a current version to a previous version.

In some embodiments, the node with administrative power 104 may send a message to each node in a portion of the mesh network or the entire mesh network to instruct each node in the portion of the mesh network or the entire mesh network to perform a roll forward of a service from the previous version to the current version.

In some embodiments, some or all of the devices and/or components of the node with administrative power 104 may be implemented with the processing device 202*b*. For example, the node with administrative power 104 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 2C:
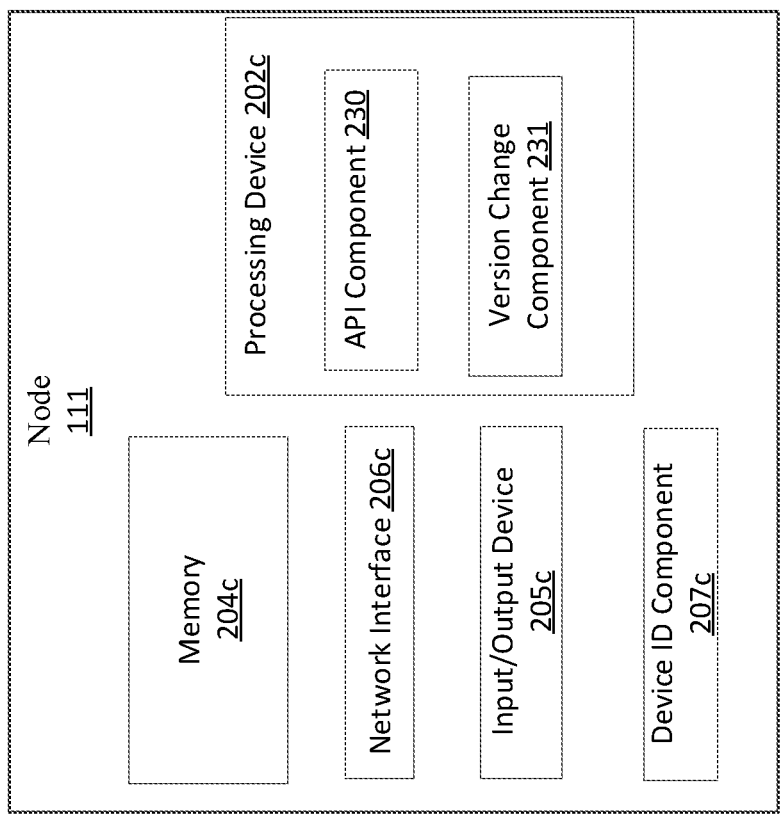
FIG. 2C is a block diagram depicting an example node in a mesh network, according to some embodiments.

FIG. 2C is a block diagram depicting an example node 111 in a mesh network, according to some embodiments. While various devices, interfaces, and logic with particular functionality are shown, it should be understood that the node 111 includes any number of devices and/or components, interfaces, and logic for facilitating the functions described herein. For example, the activities of multiple devices may be combined as a single device and implemented on a same processing device (e.g., processing device 202*c*), as additional devices and/or components with additional functionality are included.

The node 111 includes a processing device 202*c* (e.g., general purpose processor, a PLD, etc.), which may be composed of one or more processors, and a memory 204*c* (e.g., synchronous dynamic random access memory (DRAM), read-only memory (ROM)), which may communicate with each other via a bus (not shown). The processing device 202*c* includes identical or nearly identical functionality as processing device 202*a* in FIG. 2*a*, but with respect to devices and/or components of the node 111 instead of devices and/or components of the administrative node 102.

The memory 204*c* of processing device 202*c* stores data and/or computer instructions/code for facilitating at least some of the various processes described herein. The memory 204*c* includes identical or nearly identical functionality as memory 204*a* in FIG. 2A, but with respect to devices and/or components of the node 111 instead of devices and/or components of the administrative node 102.

The processing device 202*c* may include an Application Programming Interface (API) component 230 to communicate with the mesh VCLS 108. The processing device 202*c* may receive a message through the API component 230 from the administrative node 102 to instruct the node 111 to change a version of a service executing on the node 111 from a first version to a second version. The processing device 202*c* may include a version change component 231 to change the version of the service executing on the node 111 from the first version to the second version.

The node 111 includes a network interface 206*c* configured to establish a communication session with another node (e.g., a computing device) for sending and receiving data over the mesh network. Accordingly, the network interface 206*c* includes identical or nearly identical functionality as network interface 206*a* in FIG. 2A, but with respect to devices and/or components of the node 111 instead of devices and/or components of the administrative node 102.

The node 111 includes an input/output device 205*c* configured to receive user input from and provide information to a user. In this regard, the input/output device 205*c* is structured to exchange data, communications, instructions, etc. with an input/output component of the node 111. The input/output device 205*c* includes identical or nearly identical functionality as input/output device 205*a* in FIG. 2A, but with respect to devices and/or components of the node 111 instead of devices and/or components of the administrative node 102.

The node 111 includes a device identification component 207*c* (shown in FIG. 2C as device ID component 207*c*) configured to generate and/or manage a device identifier associated with the node 111. The device ID component 207*c* includes identical or nearly identical functionality as device ID component 207*a* in FIG. 2A, but with respect to devices and/or components of the node 111 instead of devices and/or components of the administrative node 102.

The node 111 includes a bus (not shown), such as an address/data bus or other communication mechanism for communicating information, which interconnects the devices and/or components of the node 111, such as processing device 202*c*, network interface 206*c*, input/output device 205*c*, device ID component 207*c*, and the memory 204*c*.

In some embodiments, some or all of the devices and/or components of node 111 may be implemented with the processing device 202*c*. For example, the node 111 may be implemented as a software application stored within the memory 204*c* and executed by the processing device 202*c*. Accordingly, such embodiment can be implemented with minimal or no additional hardware costs. In some embodiments, any of these above-recited devices and/or components rely on dedicated hardware specifically configured for performing operations of the devices and/or components.

Figure 3A:
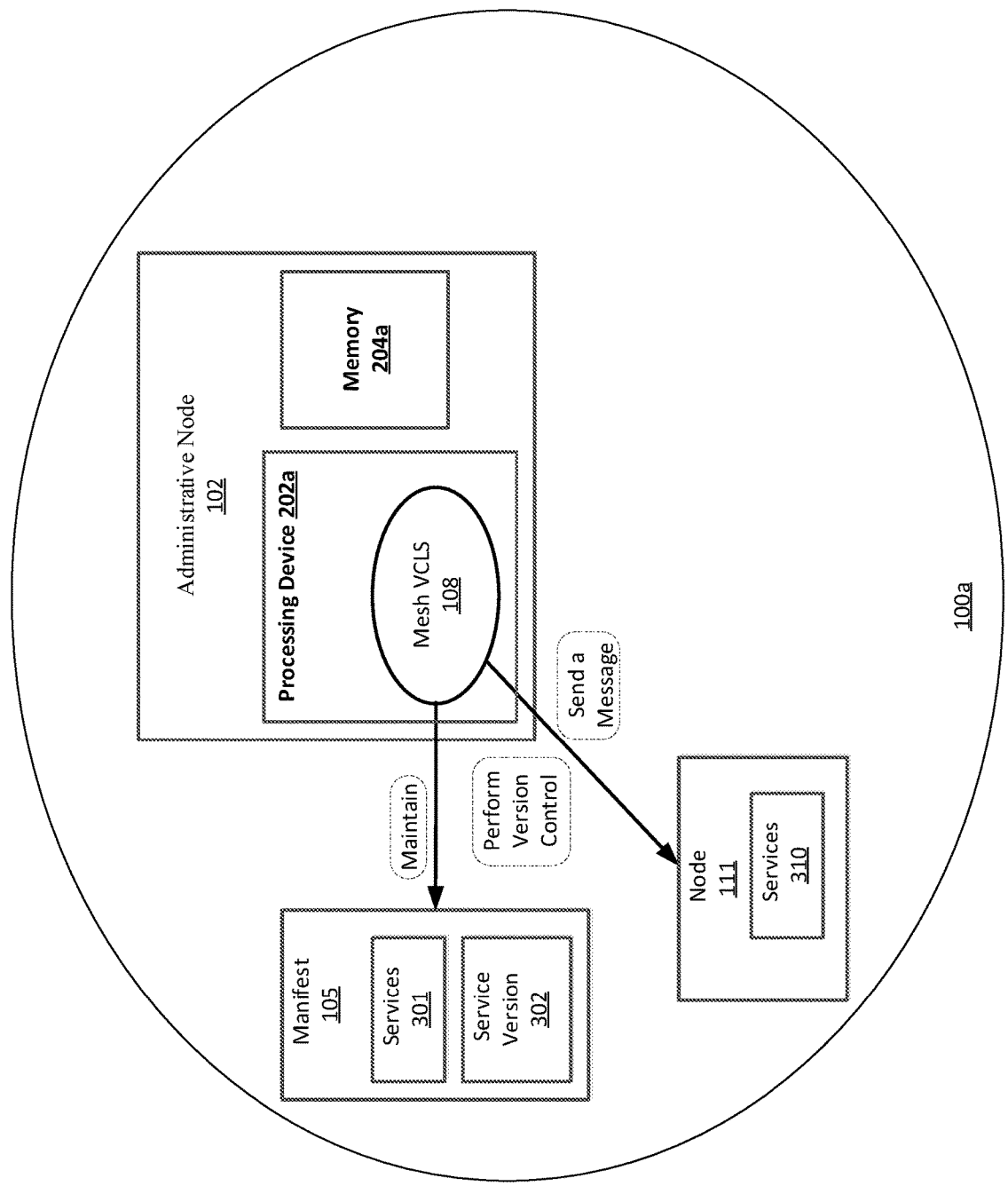
FIG. 3A is a block diagram depicting a system for performing a version control in the mesh network, according to some embodiments.

FIG. 3A is a block diagram depicting a system for performing a version control in the mesh network 100a (as illustrated in FIG. 1A), according to some embodiments. For example, the system may be the administrative node 102 of the mesh network 100a, which may comprise a memory 204a and a processing device 202a operatively coupled to the memory 204a. The processing device 202a may execute a mesh VCLS 108 to maintain a manifest 105 of the mesh network, e.g., in a storage. The manifest 105 may comprise, for each node in the mesh network, a history of one or more services 301 executing on a node and service versions 302 for the one or more services including a service version for each service of the one or more services. The processing device 202a may perform a version control of the mesh network 100a based on the manifest 105. For example, the processing device 202a may send a message to a node 111 of the mesh network 100a to instruct the node 111 to change a version of a service 310 executing on the node from a first version to a second version based on the manifest 105. In one embodiment, the processing device 202a may send the message to the node 111 to instruct the node 111 to roll back from a current version of the service 310 to a previous version of the service. In one embodiment, processing device 202a may send the message to the node 111 to instruct the node 111 to roll forward from a previous version of the service 310 to a current version of the service.

Figure 3B:
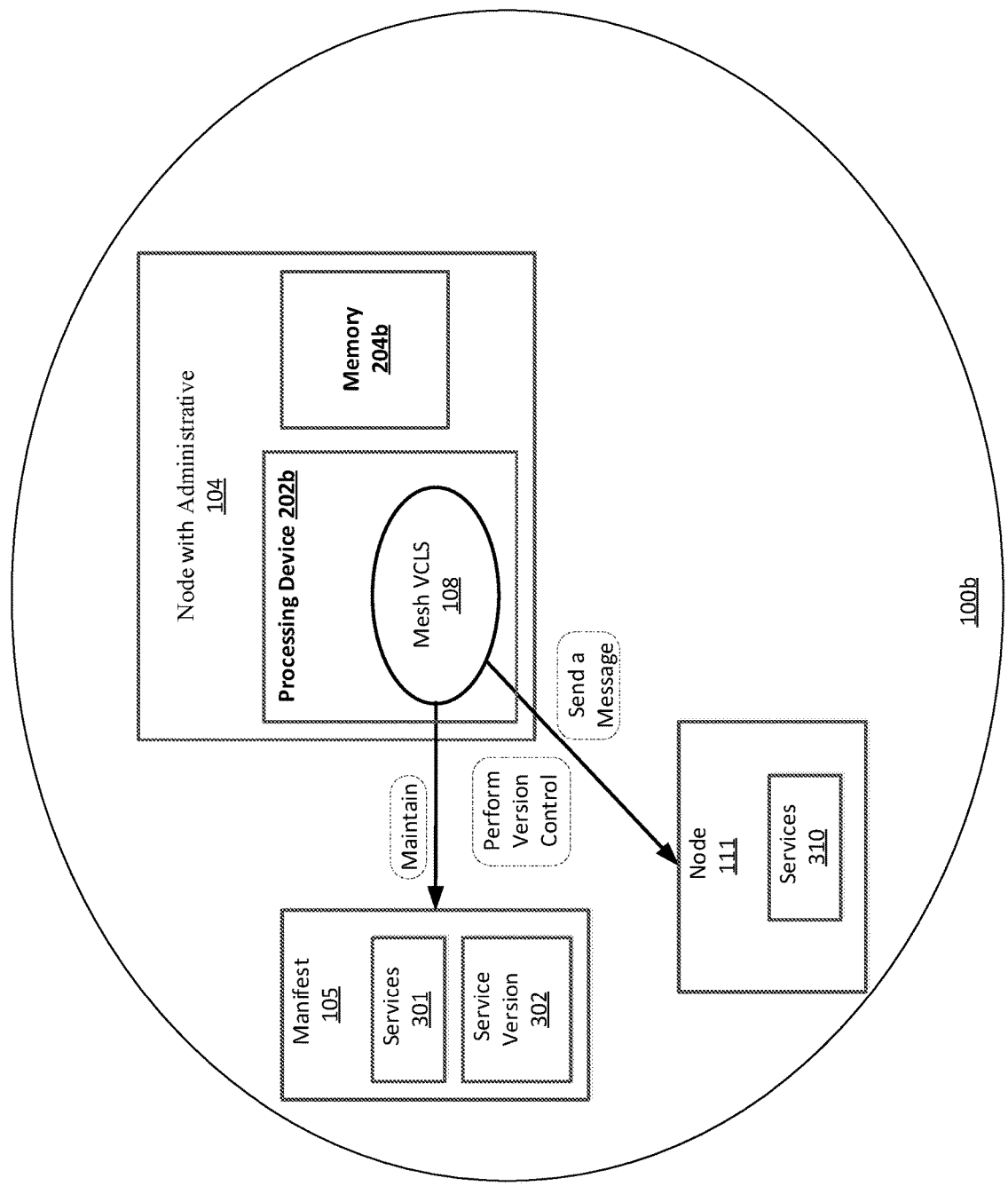
FIG. 3B is a block diagram depicting a system for performing a version control in the mesh network, according to some embodiments.

FIG. 3B is a block diagram depicting a system for performing a version control in the mesh network 100b (as illustrated in FIG. 1B), according to some embodiments. For example, the system may be the node with administrative power 104 of the mesh network 100b, which may comprise a memory 204b and a processing device 202b operatively coupled to the memory 204b. The FPVS 108 may run on any node in the mesh network, as long as the node has administrative power. Referring back to FIG. 2B, the administrative node 102 may grant administrative power to the node 104 such that the node 104 may have administrative power. For example, the node with administrative power 104 may get information of the membership of the mesh network from the administrative node 102. The node 104 may know all the nodes in the mesh network, and have information of how to access each node in the mesh network.

The processing device 202b may execute the mesh VCLS 108 to maintain a manifest 105 of the mesh network, e.g., in a storage. The manifest 105 may comprise, for each node in the mesh network, a history of one or more services 301 executing on a node and service versions 302 for the one or more services including a service version for each service of the one or more services. The processing device 202b may perform a version control of the mesh network 100b based on the manifest 105. For example, the processing device 202b may send a message to a node 111 of the mesh network 100b to instruct the node 111 to change a version of a service 310 executing on the node from a first version to a second version based on the manifest 105. In one embodiment, the processing device 202b may send the message to the node 111 to instruct the node 111a to roll back from a current version of the service 310 to a previous version of the service. In one embodiment, the processing device 202b may send a message to the node 111 to instruct the node 111 to roll forward from a previous version of the service 310 to a current version of the service.

Figure 3C:
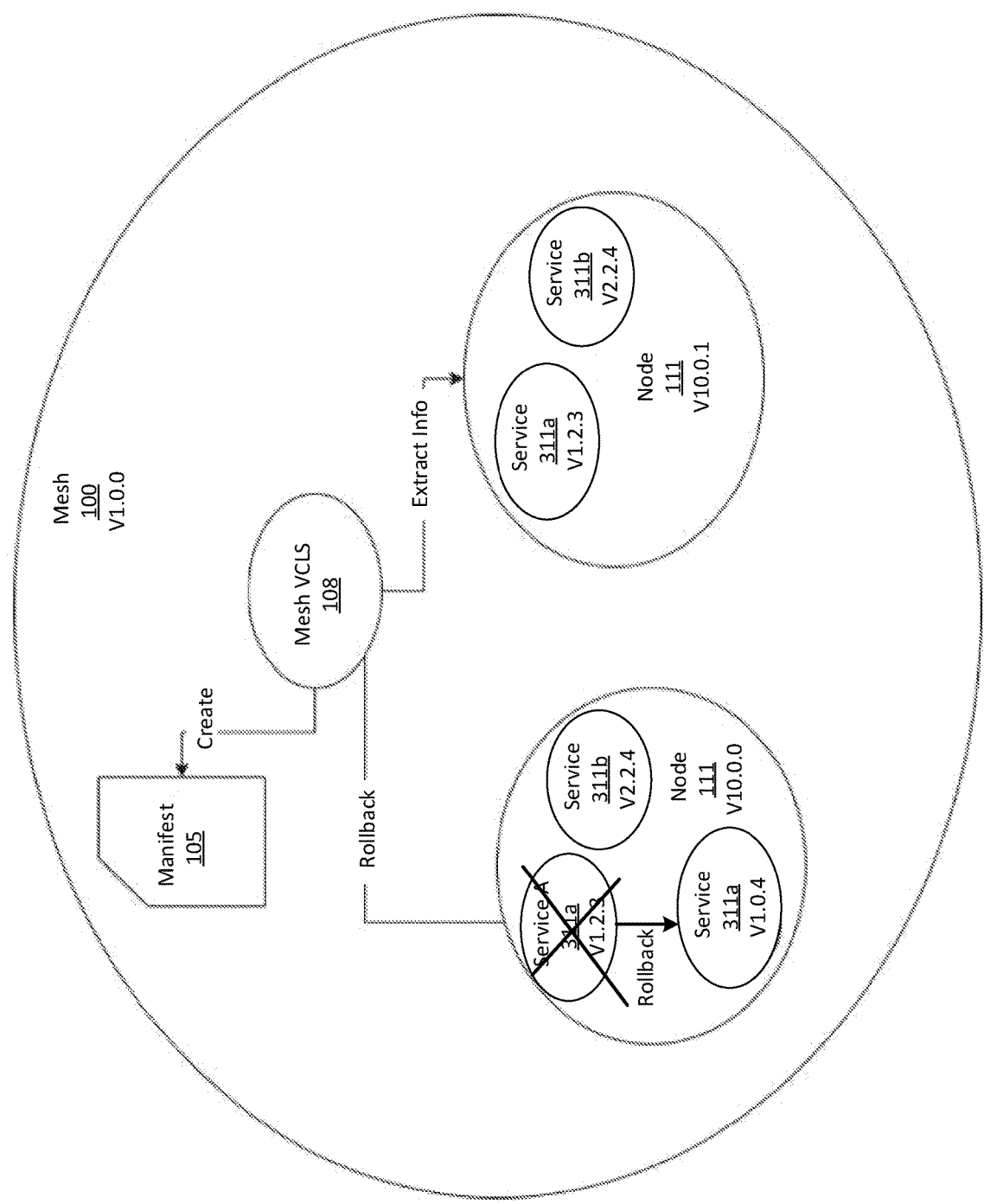
FIG. 3C is a block diagram depicting a system for performing a version control in the mesh network, according to some embodiments.

FIG. 3C is a block diagram depicting a system for performing a version control in the mesh network 100, according to some embodiments. The mesh network 100 may include the mesh network 100a as illustrated in FIG. 1A, and/or the mesh network 100b as illustrated in FIG. 1B.

The mesh network 100 may include multiple individual nodes/devices, which connect directly, dynamically and non-hierarchically to as many other nodes/devices as possible and cooperate with one another to efficiently route data from/to clients. Each node/device of the mesh network may have its own versions of firmware and service versions, at a point in time. Referring to FIG. 3C, at the point of time, the node 111 may have a firmware and multiples services 311a, 311b. The node 111 may be on firmware version 10.0.1, and the service 311a may be on version 1.2.3, and service 311b may be on version 2.2.4.

Vulnerability may be introduced in the mesh network 100, for example, because of updating a service version, and backwards compatibility of the service version may be needed from a security perspective. As an example, when a problem or a failure happens at the service 311a on the current version 1.2.3 on the node 111, in order to debug and diagnose what problem has occurred, the node may need to roll back the version of the service from the current version 1.2.3 to a previous version 1.0.4. Further, the node 111 may interact with other nodes in the mesh network 100, if only the service 311a on the node 111 is rolled back, the interactions of the node 111 with the other nodes in the mesh network may be missing, which may result in a misdiagnose of the problem. Thus, the services associated with the service 311a on other nodes in a portion of the mesh network 100 or the entire mesh network 100 may need to be rolled back as well. As another example, there might be a compatibility issue of the service 311a, thus, the service 311a might need to be rolled back to the previous version to be compatible. The services associated with the service 311a on other nodes in a portion of the mesh network 100 or the entire mesh network 100 may need to be rolled back to be compatible, as well. All nodes with the service 311a running in the mesh network may need to be rolled back.

As illustrated in FIG. 3C, the mesh VCLS 108 may sit within the mesh network 100 and maintains the manifest 105 of the mesh network. The VCLS 108 may run on an administrative node (e.g., 102) or a node with administrative power (e.g., 104) of the mesh network 100. The administrative node (e.g., 102) or the node with administrative power (e.g., 104) may provide mesh VCLS 108 the details of each node 111 in the mesh network 100. The mesh VCLS 108 may have information of the membership of the mesh network 100 from the administrative node (e.g., 102) or the node with administrative power (e.g., 104). The mesh VCLS 108 may query each individual node 111 to extract information, for example, the version of the firmware on the node 111, multiple services 311 on the node 111, a version of each service on the node 111, etc. The mesh VCLS 108 may take a snapshot of the versions of services and the version of the firmware of each node in the mesh network 100, and store the information in the manifest 105. In this way, each node in a portion of the mesh network or in the entire mesh network 100 may be rolled back to a previous version. The mesh VCLS 108 may contact each node 111 in the portion of the mesh network or the entire mesh network 100 to instruct the node to roll back a service from the current version to the previous version. In this way, the environment in the portion of the mesh network or the entire mesh network 100 at a previous point of time may be reproduced to debug and diagnose the problem, and to facilitate the recovery and healing of the mesh network 100.

The mesh VCLS 108 may have the permission to interface with the administrative capabilities of the mesh network. The mesh VCLS 108 may run on the administrative node (e.g., 102). The administrative node (e.g., 102) may host the mesh VCLS 108. However, the mesh VCLS 108 may be decoupled from the administrative node 102 from a physical installation point of view. As long as the administrative node (e.g., 102) grant the administrative power to the node 104, the VCLS 108 may run on the node with administrative power (e.g., 104). The mesh VCLS 108 may also be hosted by the node with administrative power (e.g., 104). The mesh VCLS 108 may perform the version control of the services for the life cycles of the services in the mesh network 100, which may be an extension of the administrative capabilities of the mesh network. The administrative node (e.g., 102) or the node with administrative power (e.g., 104) may initiate or start the mesh VCLS 108. The administrative node (e.g., 102) or the node with administrative power (e.g., 104) may provision the mesh VCLS 108.

Referring to FIG. 3C, the mesh VCLS 108 may create or initiate the manifest 105. The manifest 105 may include service versions on specific nodes with metadata about the nodes as well from a firmware/base operating system (OS) point of view. The mesh VCLS 108 is capable of creating a version control approach for the entire mesh network, by creating a snapshot of the manifest. The manifest 105 may comprise, for each node 111 in the mesh network 100, a history of one or more services 311 executing on the node 111 and a service version for each service of the one or more services 311. The manifest 105 may comprise, for each node 111 in the mesh network 100, a history of firmware versions executing on the node 111. For example, the manifest may include a mapping or a table containing information about, all the services on each node, the versions of the services on each node, and the firmware versions of each node corresponding to different points in time. At one point of time, the mesh network 100 may have a version of the mesh network, and each version of the mesh network 100 may have a numerical identifier. Each version of the mesh network may include, at a corresponding point in time, for each node in the mesh network, one or more services on a node, a service version for each service of the one or more services and a firmware version of the node. The manifest 105, which may be the mapping or the table, may contain metadata capturing versions of services and firmware for each node in different points of time in the mesh network. The manifest 105 may include metadata regarding information associated with the history of versions of services and firmware for each node. The manifest 105 may be updated constantly, periodically, or on demand. The mesh VCLS may own, maintain and update the manifest 1.

For example, at a point of time, as illustrated in FIG. 3C, the node 111 may have the service 311*a* on version 1.2.3, the service 311*b* on version 2.3.4, and the firmware on version 10.0.1. The mesh VCLS 108 may take a snapshot of all the nodes in the mesh network, extract the information about all the services on each node, the versions of the services on each node, and the firmware versions of each node at the point of time, and the mesh network 100 may be on a version with the numerical identifier of 1.0.0. The mesh VCLS 108 may save all the information in the manifest 105. The mesh network 100 on the version 1.0.0 may include, at the point in time, for each node 111 in the mesh network, one or more services 311 on the node, the service version for each service of the one or more services and a firmware version of the node. At another point of time, the mesh VCLS 108 may take another snapshot of all the nodes in the mesh network, extract the information about all the services on each node, the versions of the services on each node, and the firmware versions of each node at the point of time, and the mesh network 100 may be on another version with another numerical identifier. The mesh VCLS 108 may save all the information in the manifest 105, as well. The manifest 105 may include information about the history of firmware versions and services versions, which enable to analyze the history of mesh network 100 intelligently.

As an example, a repository command, such as a GIT command may be used to store the version information for individual nodes. The version information of services for individual nodes may be stored in the repository, with the ability to extract data to a granular level. For example, GIT commit, GIT pull, GIT diff or GIT branches command may be used. For example, GIT branches may be used to create branches to create different combinatorial approaches, and GIT pull command may be used to retrieve the versions of the services and the firmware versions of the mesh network. The GIT commands may enable to take a snapshot of the mesh network on demand and capture the metadata of the versions of services and firmware versions of the mesh network. The GIT commands may create a historical auditing trail of the life cycle of services in the mesh network. The metadata of the versions of services and firmware versions of the mesh network may be stored in a GIT repository. The mesh VCLS 108 may use the GIT commands to navigate through the GIT repository. The mesh VCLS 108 may send the GIT commands to the GIT repository to retrieve information about the versions of services and firmware versions of the mesh network at different points in time.

The mesh VCLS 108 may perform version control of all firmware of all the nodes, and access the historical firmware versions of all the nodes in the mesh network. With the mesh VCLS 108, the mesh network 100 may be rolled forward and backwards as a whole, thereby recreating the mesh network 100 at a specific point in time, either by a version or a timestamp. Only a portion of the mesh network may be rolled backwards with the mesh VCLS 108, as well. For example, as illustrated in FIG. 3C, a request may come in indicating that an API matching to an older version 1.0.4 of the service 311*a* on the node 111. The mesh VCLS 108 may send a message to the node 111 to instruct the node 111 to roll back the service 311*a* from the current version 1.2.3 to the previous version 1.0.4. In some embodiments, the nodes running the service 311*a* in a portion/part of the mesh network 100 may be isolated for security compliance. The nodes running the service 311*a* in the portion/part of the mesh network 100 may be rolled back to the older version 1.0.4 of the service 311*a*. As another example, if the node 111 with a newest firmware version or a newest software version goes down (e.g., performance issue, high CPU usage, etc.), the mesh VCLS 108 may send a message to the node 111 to instruct the node 111 to roll back to a previous healthy version, and consequently all other nodes trying to update to the newest version may be rolled back to the previous heathy version until it is determined whether the newest version is a safe version. If the newest version is a safe version, the mesh VCLS 108 may send a message to the node 111 and all other nodes to instruct the node 111 and all other nodes to forward to the newest version.

The membership of the mesh network 100 may change, with one or more nodes joining and leaving the mesh network 100 dynamically. When one or mode nodes leave or join the mesh network 100, the environment of the mesh network 100 at a previous point in time may not be reproduced or recreated because the hardware changes. In this situation, the mesh VCLS 108 may inform the administrative node 102 or the node with administrative power that the membership of the mesh network 100 has changed, the difference between the nodes of the mesh network in the previous time and the nodes of the mesh network in the current time, or the percentage of the mesh network that may be recreated, reproduced, or restored. In order to recreate 100% of the mesh network in the previous time, the nodes of the mesh network in the previous time may need to be restored. The one or more notes which have left the mesh network may need to rejoin and the one or more nodes which have joined the mesh network may need to leave the mesh network.

The mesh VCLS 108 may enable an auditing mechanism for mesh lifecycle changes and actions. The mesh VCLS may enable an auditing mechanism for mesh lifecycle changes and actions. For example, the mesh VCLS may allow the recreation of portions of the mesh network or the entire mesh network through the usage of the repository command, such as GIT command, thereby allowing for self-healing properties if one or more nodes in the mesh network may go down or if an expansion of the mesh network may be required. The capability of rolling all of the services in the portion of the mesh network 100 or the entire mesh network may enable diagnosing the problem in the mesh network holistically and accurately, because not only the service on the node under investigation but also the interactions of the node across the mesh network are provided. The environment of mesh network 100 in a previous point of time may be reproduced. Thus, the failure of the service in the mesh network may be solved and the mesh network may be recovered.

In this way, a problem in client side expectation may be solved, where backwards compatibility may be needed. The mesh VCLS 108 may allow the mesh network 100 to stay at the latest versions at all times with the capability to dynamically switch to an older version as needed, in an isolated manner, thus providing the most secure experience with compatibility in mind.

Figure 4:
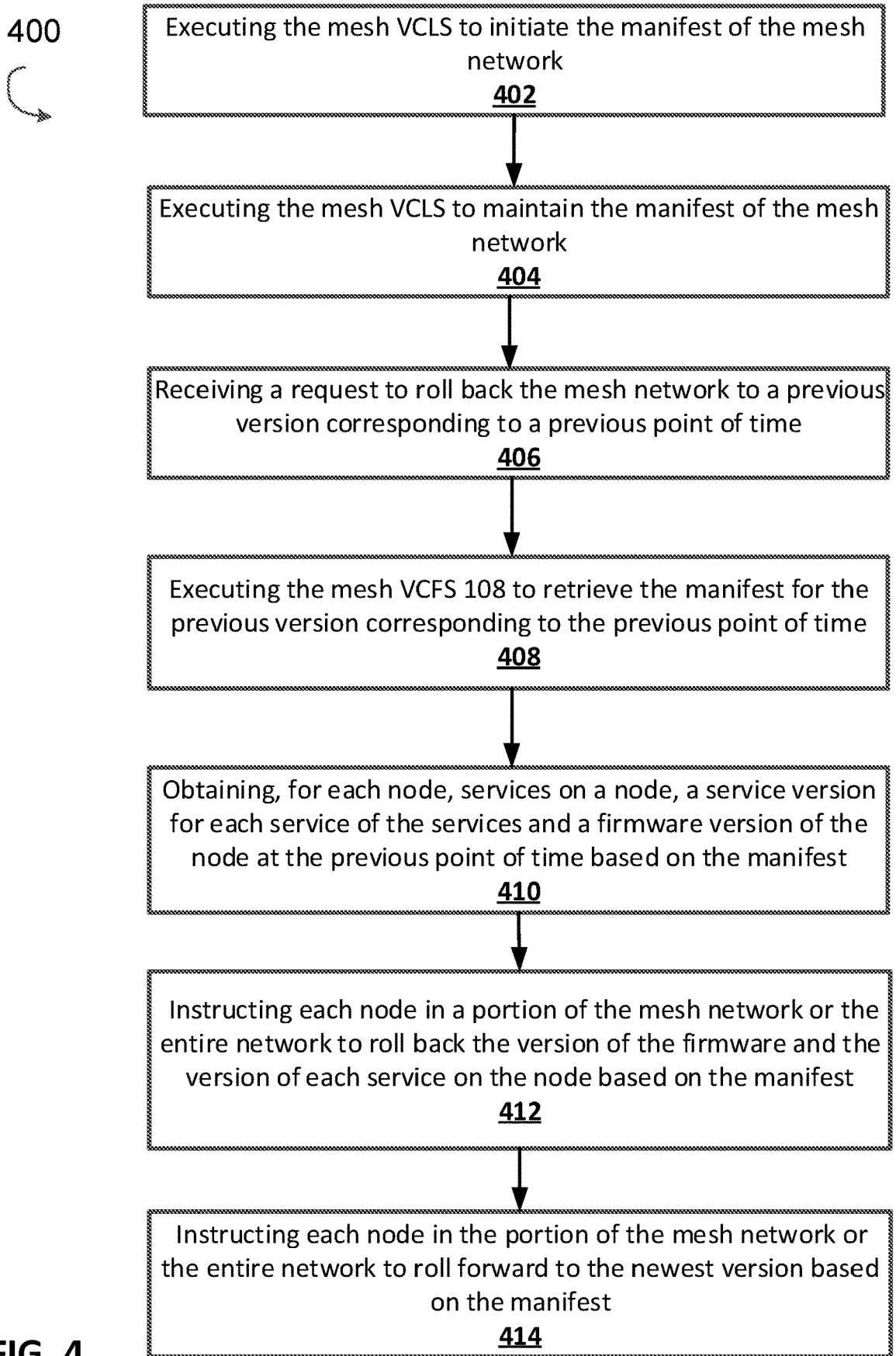
FIG. 4 is a flow diagram depicting a method of performing a version control in a mesh network, according to some embodiments.

FIG. 4 is a flow diagram depicting a method 400 of performing a version control in a mesh network, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 400 may be performed by an administrative node in a mesh network, such as the administrative node 102 in FIG. 1A. In some embodiments, method 400 may be performed by a node with administrative power in the mesh network, such as the node with administrative power 104 in FIG. 1B.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

At block 402, the administrative node or the node with administrative power may execute the mesh VCLS to initiate the manifest of the mesh network. For example, the administrative node or the node with administrative power may query each node in the mesh network to extract information of firmware version of a node, services running on the node, and versions of the services running on the node at a point of time, and save the information in the manifest.

At block 404, the administrative node or the node with administrative power may execute the mesh VCLS to maintain the manifest of the mesh network. The administrative node or the node with administrative power may execute the mesh VCLS to take a snapshot of each node in the mesh network, extract the information about all the services on each node, the versions of the services on each node, and the firmware version of each node at different points of time. The manifest may include information about the history of firmware versions and services versions. At one point of time, the mesh network may have a corresponding version. Different versions of the mesh network may correspond to different points of time. Each version of the mesh network may correspond to a specific point of time, and may have a corresponding numerical identifier. Each version of the mesh network may include, at the corresponding point in time, for each node in the mesh network, one or more services on a node, a service version for each service of the one or more services and a firmware version of the node. The administrative node or the node with administrative power may execute the mesh VCLS to update the manifest periodically, or on demand.

At block 406, the administrative node or the node with administrative power may receive a request to roll back the mesh network to a previous version corresponding to a previous point of time.

At block 408, the administrative node or the node with administrative power may execute the mesh VCFS to retrieve the manifest of the mesh network for the previous version of the mesh network corresponding to the previous point of time. For example, the mesh VCLS may execute a GIT pull command to retrieve the manifest.

At block 410, the mesh VCLS may obtain all the version numbers of individual nodes and their service profiles at the previous point of time based on the manifest. The mesh VCLS may obtain, or each node in the mesh network, one or more services on a node, a service version for each service of the one or more services and a firmware version of the node. The mesh VCLS may have the information from an administrative perspective for how to contact each of the nodes in the mesh network. For example, a node may only be contacted through radio frequency.

At block 412, the mesh VCLS may contact and instruct each node in a portion of the mesh network or the entire network, from an operating system level, to roll back the version of the firmware and the version of each service on the node based on the manifest. The mesh VCLS 108 may instruct each node to roll back its version of firmware to the version that is at the previous point of time in the manifest, and instruct the node to roll back to the version of each service on the node to the version that is at the previous point of time in the manifest. As an example, the mesh VCLS may have access to the node and perform the roll back/downgrade. As another example, there may be a client on the node who may receive the instruction from the mesh VCLS and perform the rollback/downgrade.

At block 414, the mesh VCLS may contact and instruct each node in the portion of the mesh network or the entire mesh network to roll forward to the newest version of the firmware and the newest version of each service on the node based on the manifest. For example, the request to roll back the mesh network to the previous version may result from an issue in performance, CPU usage, or safety concerns, etc. After the issue has been solved, the portion of the mesh network or the entire mesh network may be rolled forward to the newest version of the mesh network.

FIG. 5 is a flow diagram depicting a method 500 of performing a version control in a mesh network, according to some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 500 may be performed by an administrative node in a mesh network, such as the administrative node 102 in FIG. 1A. In some embodiments, method 400 may be performed by a node with administrative power in the mesh network, such as the node with administrative power 104 in FIG. 1B.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5, the method 500 includes the block 502 of executing, by a processing device, the mesh VCLS to maintain a manifest of a mesh network, where the manifest comprises, for each node in the mesh network, a history of one or more services executing on a node and a service version for each service of the one or more services. The method 500 includes the block 504 of performing a version control of the mesh network based on the manifest, which includes the block 506 of sending a message to a first node of the mesh network to instruct the first node to change a version of a service executing on the first node from a first version to a second version.

Figure 6:
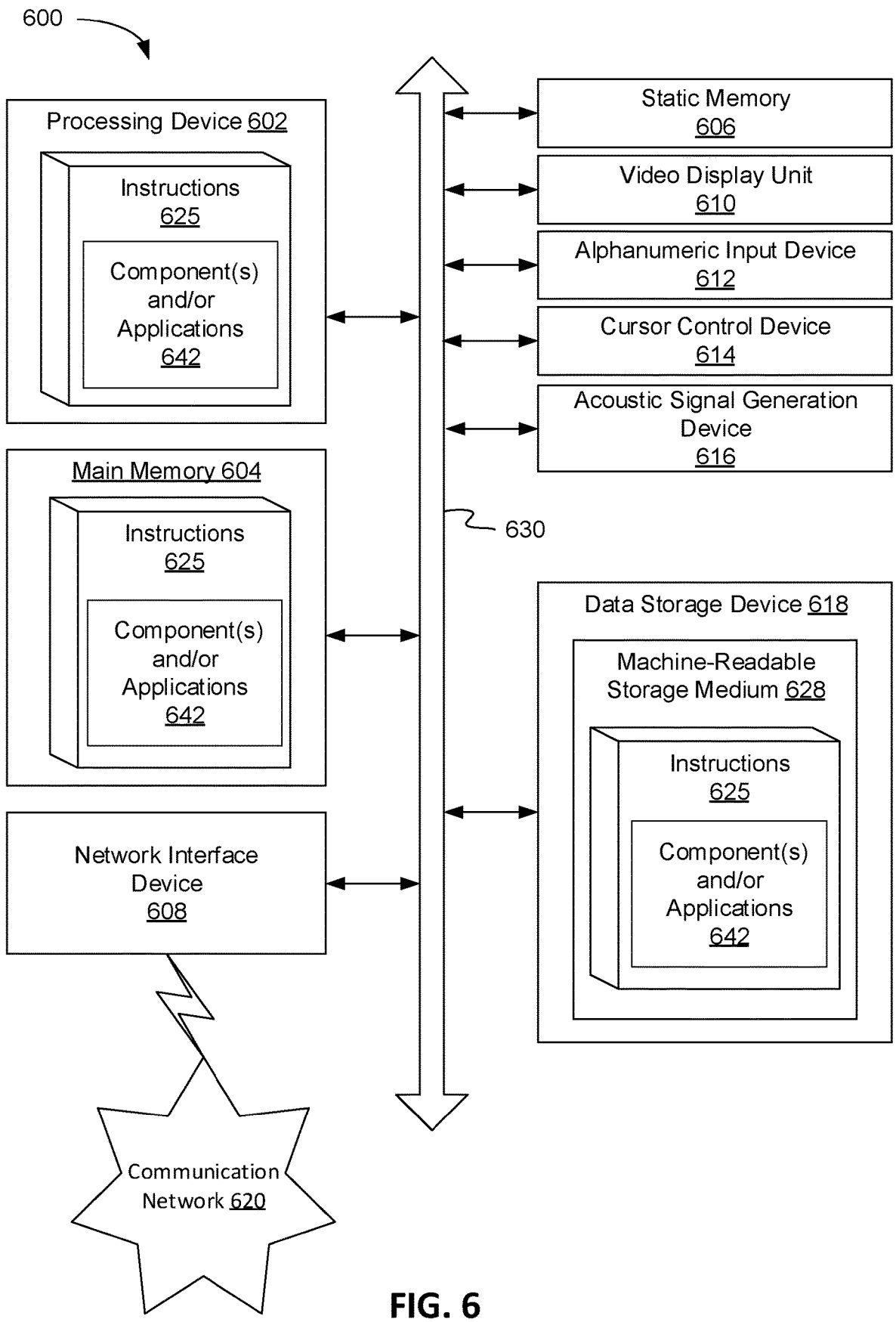
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a communication network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for one or more components and/or applications 642 (e.g., mesh VCLS 108, version control component 214 in FIG. 2A, FIG. 2B, administrative component 222 in FIG. 2A, or administrative power component 223 in FIG. 2B) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a communication network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "executing," "performing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
   executing, by a processing device, a mesh version control life cycle service (VCLS) to initiate a manifest of a mesh network by querying each node in the mesh network, the manifest comprising, for each node in the mesh network, a history of one or more services executing on a node and a service version for each service of the one or more services; and
   performing a version control of the mesh network based on the manifest, comprising:
      sending a message to a first node of the mesh network to instruct the first node to change a version of a service executing on the first node from a first version to a second version.

2. The method of claim 1, wherein the manifest comprises a mapping including a history of one or more versions of the mesh network corresponding to one or more points in time, and wherein each version of the mesh network has a numerical identifier.

3. The method of claim 2, wherein each version of the mesh network including, at a point in time, for each node in the mesh network, one or more services on a node, a service version for each service of the one or more services and a firmware version of the node.

4. The method of claim 1, wherein the performing the version control of the mesh network based on the manifest further comprises sending a message to each node in at least a portion of the mesh network to instruct each node in at least the portion of the mesh network to perform a rollback of a service from a current version to a previous version.

5. The method of claim 1, wherein the performing the version control of the mesh network based on the manifest further comprises sending a message to each node in at least a portion of the mesh network to instruct each node in at least the portion of the mesh network to perform a roll forward of the service from the previous version to the current version.

6. The method of claim 1, wherein the executing the mesh VCLS to maintain the manifest of the mesh network comprises executing the mesh VCLS to issue a command associated with a repository, and wherein the manifest of the mesh network is stored at the repository.

7. A system comprising:
   a memory; and
   a processing device, operatively coupled to the memory, the processing device to:
      execute, by a processing device, a mesh version control life cycle service (VCLS) to initiate a manifest of a mesh network by querying each node in the mesh network, the manifest comprising, for each node in the mesh network, a history of one or more services executing on a node and a service version for each service of the one or more services; and
      perform a version control of the mesh network based on the manifest, comprising:
         send a message to a first node of the mesh network to instruct the first node to change a version of a service executing on the first node from a first version to a second version.

8. The system of claim 7, wherein the manifest comprises a mapping including a history of one or more versions of the mesh network corresponding to one or more points in time, and wherein each version of the mesh network has a numerical identifier.

9. The system of claim 8, wherein each version of the mesh network including, at a point in time, for each node in the mesh network, one or more services on a node, a service version for each service of the one or more services and a firmware version of the node.

10. The system of claim 7, wherein the processing device is further to:
    send a message to each node in at least a portion of the mesh network to instruct each node in at least the portion of the mesh network to perform a rollback of a service from a current version to a previous version.

11. The system of claim 7, wherein the processing device is further to:
    send a message to each node in at least a portion of the mesh network to instruct each node in at least the portion of the mesh network to perform a roll forward of the service from the previous version to the current version.

12. The system of claim 7, wherein the processing device is further to:
    execute the mesh VCLS to issue a command associated with a repository, and wherein the manifest of the mesh network is stored at the repository.

13. A non-transitory computer-readable medium storing instructions that, when executed by a processing device, cause the processing device to:
    execute, by the processing device, a mesh version control life cycle service (VCLS) to initiate a manifest of a mesh network by querying each node in the mesh network, the manifest comprising, for each node in the mesh network, a history of one or more services executing on a node and a service version for each service of the one or more services; and
    perform a version control of the mesh network based on the manifest, comprising:
       send a message to a first node of the mesh network to instruct the first node to change a version of a service executing on the first node from a first version to a second version.

14. The non-transitory computer-readable medium of claim 13, wherein the manifest comprises a mapping including a history of one or more versions of the mesh network corresponding to one or more points in time, and wherein each version of the mesh network has a numerical identifier.

15. The non-transitory computer-readable medium of claim 14, wherein each version of the mesh network including, at a point in time, for each node in the mesh network, one or more services on a node, a service version for each service of the one or more services and a firmware version of the node.

16. The non-transitory computer-readable medium of claim 13, wherein the processing device is further to:
    send a message to each node in at least a portion of the mesh network to instruct each node in at least the portion of the mesh network to perform a rollback of a service from a current version to a previous version.

17. The non-transitory computer-readable medium of claim 13, wherein the processing device is further to:
    send a message to each node in at least a portion of the mesh network to instruct each node in at least the portion of the mesh network to perform a roll forward of the service from the previous version to the current version, and
    execute the mesh VCLS to issue a command associated with a repository, and wherein the manifest of the mesh network is stored at the repository.

* * * * *